United States Patent [19]

Watt

[11] 4,417,231

[45] Nov. 22, 1983

[54] ENGINE OVER-TEMPERATURE AND OIL PRESSURE LOSS AUDIBLE WARNING DEVICE

[76] Inventor: Richard E. Watt, 6384 Rockhurst Dr., San Diego, Calif. 92120

[21] Appl. No.: 253,031

[22] Filed: Apr. 10, 1981

[51] Int. Cl.³ .......................... G08B 19/00; B60Q 5/00
[52] U.S. Cl. ............................. 340/52 F; 307/10 R; 340/57; 340/60; 340/515; 340/516
[58] Field of Search .................. 340/52 F, 57, 60, 626, 340/516, 584, 515; 307/10 R, 117, 118; 73/345, 346, 347

[56] References Cited

U.S. PATENT DOCUMENTS

| | | | |
|---|---|---|---|
| 3,302,171 | 1/1967 | Sensing | 340/57 |
| 3,866,166 | 2/1975 | Kerscher et al. | 307/10 R X |
| 3,893,108 | 7/1975 | McBride, Jr. et al. | 340/52 F X |
| 3,906,440 | 9/1975 | Haupt | 340/60 X |
| 3,949,356 | 4/1976 | Fuzzell et al. | 340/52 F |
| 4,107,646 | 8/1978 | Arai et al. | 340/52 F |
| 4,136,329 | 1/1979 | Trobert | 340/52 F |
| 4,287,504 | 9/1981 | Simon et al. | 340/52 F |
| 4,317,364 | 3/1982 | Asano et al. | 340/52 F X |

Primary Examiner—Glen R. Swann, III

[57] ABSTRACT

An audible warning device is disclosed that is for use with internal combustion engines to monitor engine temperature and oil pressure and produce an audible warning signal if an over-temperature or oil pressure loss situation develops. An integrated circuit voltage comparator compares the output of a variable resistance temperature sensor against a reference voltage that is generated by a resistor network. The comparator drives an audible signal transducer to warn an operator of an over-temperature condition. Additionally, an input to the comparator from an oil pressure switch causes an audible warning to be produced if a loss of oil pressure is encountered. Self-test features are included to produce momentary audible signals each time the engine is started to indicate proper circuit functioning.

An alternate embodiment of the invention uses digital techniques and a microprocessor as a digital comparator to monitor the engine's temperature and oil pressure and operate the warning transducer if a dangerous situation develops.

6 Claims, 2 Drawing Figures

ENGINE OVER-TEMPERATURE AND OIL PRESSURE LOSS AUDIBLE WARNING DEVICE

BACKGROUND OF INVENTION

The present invention generally pertains to the field of internal combustion engine instrumentation. It is common practice in prior art to equip engines used for various applications with temperature and oil pressure gauges or sometimes only with visual lamp type indicators. Such instrumentation may be sufficient in some cases where trained operators continually monitor the engine's gauges or indicators. However, in automotive usage, the average operator rarely observes the engine's temperature and/or oil pressure instrumentation. An over-temperature situation caused by a loss of coolant or a broken water pump belt usually goes undetected until the operator senses a drastic change in performance. Sometimes extensive damage has resulted by the time the over-temperature condition is noticed. Some automobiles have engine oil pans that are very vulnerable to damage from objects normally encountered in parking lots, driveways and road dips. Loss of oil from a leaking oil pan usually goes unnoticed until the engine has suffered substantial damage.

In the present invention, a solid state electronic monitor is connected to the engine's temperature sensor and to an oil pressure switch. An audible signal transducer, driven by the solid state monitor, audibly warns the operator of an over-temperature or oil pressure loss condition so that the engine can be shut off before damage ensues. Diesel engines are particularly susceptible to being damaged from malfunctions in the cooling system due to the high temperatures that quickly build up from the heat of the high compression-ratio combustion process. Mercedes Benz diesel automobiles have particularly vulnerable oil pans and yearly a considerable number of engines are ruined from loss of oil. This invention, although applicable to any engine system, is particularly intended for Mercedes Benz diesel automobiles.

SUMMARY OF INVENTION

An audible warning device according to the present invention that functions to monitor internal combustion engine temperature and oil pressure and produce an audible warning signal if an over-temperature or oil pressure loss situation develops. The device compares the analog representation of engine temperature produced by the engine's temperature sensor against the analog representation of a reference temperature generated by a resistor voltage divider to produce an output indication signal. This signal operates an audible signal transducer, when the engine temperature exceeds the predetermined reference temperature. Comparison of the two analog signals is by means of a high input impedance integrated circuit operational amplifier, functioning as a voltage comparator.

Additionally, an input from an oil pressure switch to the operational amplifier causes the output indication signal to be produced in the event of an oil pressure loss, thus operating the audible signal transducer.

On diesel engine vehicles, an input from the engine's glow plug circuit inhibits the action of the input from the oil pressure switch to prevent unnecessary operation of the warning transducer during glow plug operation prior to engine starting.

An automatic self-test feature is provided by simulating an over-temperature condition whenever power is initially applied to the said device. The test circuit automatically produces a momentary output indication signal which yields a short duration audible signal to indicate proper circuit functioning. Also, a second short duration audible signal is produced when the engine is started, until the oil pressure switch is activated. This tests the oil pressure switch input to the said device.

In an alternate embodiment, the engine temperature is converted to digital form by an analog to digital converter and is compared against a digitally-stored reference temperature by an integrated circit microprocessor operating as a digital comparator. An output from the microprocessor operates the audible signal transducer if an over-temperature situation develops. In addition, oil pressure as a voltage discrete or in digital form, as generated by an itechronic oil pressure sensor, is monitored by the microprocessor. A loss of oil pressure will also cause the microprocessor to operate the audible signal transducer. Automatic test features function in the same manner as in the preferred embodiment.

DESCRIPTION OF THE PREFERRED EMBODIMENT

Figure 1:
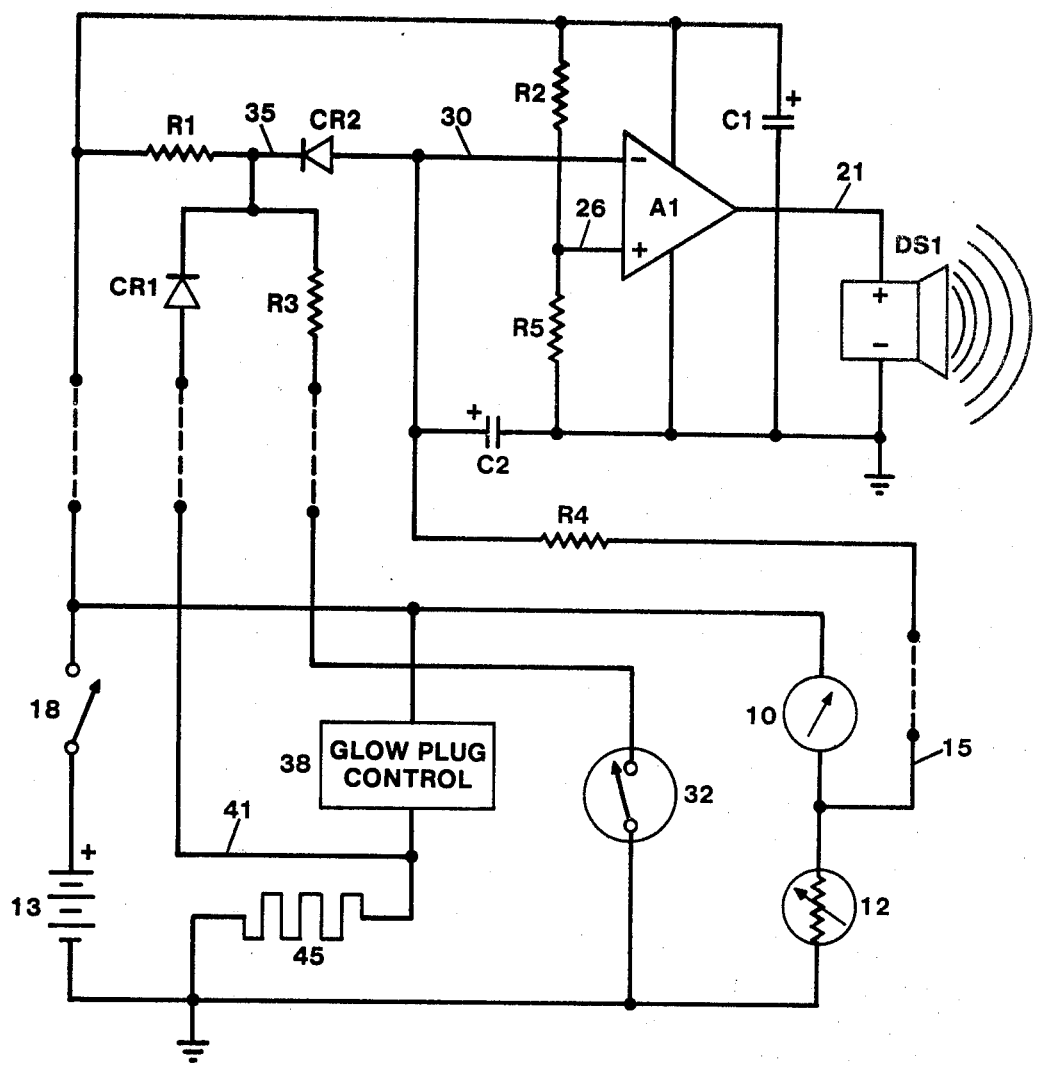
FIG. 1 is a schematic drawing showing an over-temperature and oil pressure loss audible warning debice according to the present invention.

An over-temperature and oil pressure loss audible warning device for use with internal combustion engines is shown in FIG. 1. An engine temperature sensor 12 and a series connected temperature gauge 10 are powered by the engine's 12 Vdc battery system 13 when switch 18 is closed. In the preferred embodiment, the temperature sensor 12 is a negative temperature coefficient device thus producing at line 15 an inversely varying dc voltage analog representation of the engine temperature. This voltage analog of temperature at line 15 is coupled to the inverting input of integrated circuit voltage comparator A1 at line 30, via resistor R4.

A dc voltage analog representation of a predetermined reference temperature is generated at line 26 by resistor R2 series connected with resistor R5. The reference temperature to which the analog representation at line 26 is set is predetermined to be a temperature greater than the normal maximum engine operating temperature. The input at line 30 to voltage comparator A1 is a more positive voltage than the reference input at line 26 at normal or below normal engine temperatures. For a condition where the engine temperature exceeds that of the reference temperature, the analog input at line 30 will become less positive than that of the analog reference input at line 26 and voltage comparator A1 will produce at its output an output indication signal at line 21, which will change state from approximately 0 Vdc to approximately +12 Vdc. This action turns on the audible signal transducer DS1.

The resistor R4 and capacitor C2 combination provides an automatic self-test mode when power is turned on to the audible warning device. With capacitor C2 in a discharged state, prior to the application of battery power, the initial ine 30 input to voltage comparator A1 is 0 Vdc. As power is applied, the line 21 output of voltage comparator A1 goes to +12 Vdc producing a momentary output indication signal and causing an output from transducer DS1. The line 30 input to voltage comparator A1 becomes increasingly positive as capacitor C2 begins to charge, via resistor R4, to the potential of line 15. When line 30 becomes more positive than the reference voltage at line 26 then the line 21 output of voltage comparator A1 changes state to 0 Vdc and the audible output of transducer DS1 ceases. The length of time of this momentary self-test signal is determined by the values of R4 and C2.

An alternate embodiment of this self-test feature uses a pushbutton switch or relay contacts in place of capacitor C2. Operation of the switch or relay will momentarily ground line 30 and produce an output from transducer DS1.

Loss of engine oil pressure will also result in a warning output from the audible signal transducer DS1. In this case, oil pressure switch 32, whose contacts are open under pressure conditions, closes when the oil pressure drops below a predetermined threshold. This action applies a ground potential to resistor R3 which is series connected with resistor R1 to the direct current battery system 13, via closed switch 18. Voltage divider action of resistors R1 and R3 produces a predetermined potential at line 35. The predetermined potential at line 35 is coupled by diode CR2 to line 30 and is less positive than the analog reference potential at line 26, which is determined by resistor R2 and R5. This action causes voltage comparator A1 to produce the aforementioned output indication signal at line 21 and turns on the audible signal transducer DS1.

Prior to starting a diesel engine, the glow plugs 45 are heated under control of the glow plug control circuit 38. This action results from switching the voltage from the engine's direct current battery system 13 across the glow plug circuit 45. For a +12 volt system, line 41 becomes a potential of from +10 Vdc to +12 Vdc during the operation of the glow plugs. The line 41 potential is conducted through forward biased diode CR1 to line 35 to counteract the effect of the closed contacts of switch 32, as previously discussed. This prevents the operation of the audible signal transducer DS1, which would result from the absence of oil pressure, during glow plug operation prior to starting the engine.

When the engine is started, a second audible test signal is emitted from transducer DS1, due to the cessation of glow plug potential at line 41 and the fact that the buildup of oil pressure does not instantly cause oil pressure switch 32 to open its contacts. This action appears as a momentary "loss of oil pressure," yielding a second short duration test signal.

During normal engine operation, line 41 is near ground potential due to the low resistance of the glow plugs 45, oil pressure switch 32 is an open circuit and line 35 is at approximately +12 Vdc. Both CR1 and CR2 are back biased by the potential at line 35 and hence block any interference of the oil pressure loss circuitry with the normal temperature monitoring circuitry.

The value and/or part identities of the components shown in the preferred embodiment of FIG. 1 are as follows:
INTEGRATED CIRCUIT:
 A1; RCA CA3140 BiMOS Operational Amplifier, with MOS/FET input and biopolar output.
CAPACITORS:
 C1; 33uf, 25 Vdc electrolytic capacitor
 C2: 10uf, 35 Vdc electrolytic capacitor
DIODES:
 CR1 and CR2; 1N4148
AUDIBLE SIGNAL TRANSDUCER:
 DS1; Projects Unlimited X20F24 piezotransducer
RESISTORS:
 R1; 22K, ¼W, 5%
 R2; 7.87K, 1/10W, 1%
 R3; 820Ω, ¼W, 5%
 R4; 120K, ¼W, 5%
 R5; 732Ω, 1/10W, 1%

Figure 2:
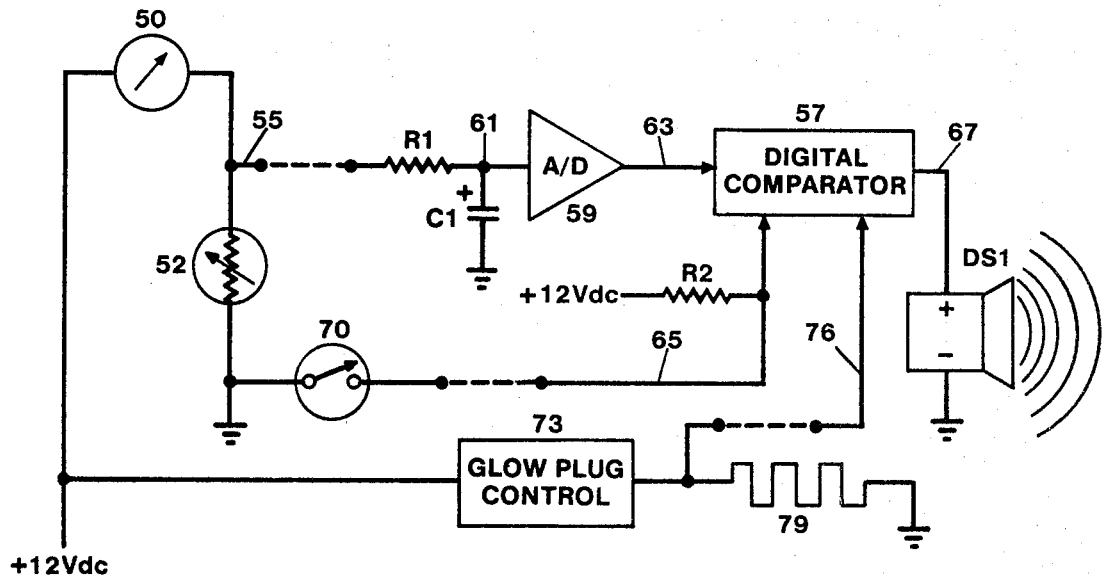
FIG. 2 is a schematic drawing of an alternate embodiment using digital techniques.

An alternate embodiment of the invention is shown in FIG. 2. An engine temperature sensor 52, series connected with the temperature gauge 50 produces at line 55 an analog representation of the engine's temperature. The resistor R1 and capacitor C1 combination produces a momentary ground at line 61 during startup to produce an audible test output from transducer DS1, as in the preferred embodiment. The digital output 63 of analog to digital converter 59 is inputted to the digital comparator/microprocessor 57, where it is compared with the predetermined reference temperature which is stored in the digital comparator 57. When the digital temperature input 63 is numercially less than the reference temperature, the digital comparator 57 produces an output indication signal at line 67, which turns on the transducer DS1.

A voltage discrete input at line 65 to digital comparator/microprocessor 57 is either +12 Vdc due to pull up resistor R2 or 0 Vdc depending on the position of the contacts of oil pressure switch 70. Below a predetermined oil pressure, the contacts of switch 70 are closed and the line 65 input is at 0 Vdc. This is sensed by the digital comparator/microprocessor 57, and if the line 76 input from the glow plug control circuit 73 and glow plugs 79 is at approximately 0 Vdc, it produces an output indication signal at line 67, which turns on the transducer DS1. The glow plug discrete input 76 to digital comparator/microprocessor 57 prevents the operation of transducer DS1 during the glow plug operation prior to starting the engine.

Where oil pressure representation is generated by an electronic oil pressure sensor and is in a form other than a voltage discrete, then it can be inputted in digital comparator form to the digital comparitor/microprocessor 57 by means of an additional input to the analog to digital converter 59 and compared with a predetermined oil pressure reference in digital form to determine the operation of transducer DS1.

Having described my invention, I now claim:

1. An audible warning device for use with internal combustion engines having a temperature indicating means, a temperature sensor and battery power from an ignition switch, the warning device monitoring engine temperature and oil pressure and producing an audible warning if an over-temperature or oil pressure loss condition develops, the improvement comprising:
 electronic representation of a predetermined reference temperature and a predetermined reference oil pressure;
 an electronic oil pressure sensing means connected to the engine's oil pressure system;
 an electronic comparator responsive to the engine's temperature indicating and sensing system and said oil pressure sensing means, which compares a representation of the engine temperature, generated by the engine's temperature sensor, and a representation of oil pressure from said oil pressure sensing means, against said predetermined references and provides an output indication signal when the engine temperature becomes greater in magnitude or the oil pressure becomes less in magnitude than said predetermined references;

an audible signal transducer connected to the output of said electronic comparator, which produces an audio output at the presence of the output indication signal;

first electronic circuitry means interposed between said electronic comparator's temperature sensor input and the engine's temperature indicating and sensing system, producing a momentary output indication signal from said electronic comparator when the engine's ignition switch is switched on, resulting in a momentary audio output from said audible signal transducer as a first self-test; and second electronic circuitry means interposed between said electronic comparator's oil pressure sensor input and the said oil pressure sensing means, producing a momentary output indication signal from said electronic comparator when engine startup occurs, prior to the buildup of engine oil pressure, resulting in a momentary audio output from said audible signal transducer as a second self-test.

2. An audible warning device according to claim 1, for use with internal combustion engines additionally having glow plugs and a glow plug control circuit, wherein said second electronic circuitry means additionally comprises circuitry interposed between said electronic comparator's oil pressure sensor input and the engine's glow plugs such that the presence of a direct current potential on the glow plugs acts to inhibit the output indication signal during glow plug operation, prior to engine startup.

3. An audible warning device for use with internal combustion engines having a temperature indicating means, a temperature sensor, and battery power from an ignition switch, the warning device monitoring engine temperature and producing an audible warning if an over-temperature condition develops, the improvement comprising:

an electronic representation of a predetermined reference temperature;

an electronic comparator responsive to the engine's temperature indicating and sensing system which compares a representation of the engine temperature, generated by the engine's temperature sensor, against said representation of a predetermined reference temperature, and provides an output indication signal when the engine temperature becomes greater in magnitude than said predetermined reference temperature, wherein said electronic comparator comprises an analog to digital converter and a microprocessor functioning as a digital comparator;

an audible signal transducer connected to said electronic comparator's output, which produces an audible warning signal at the presence of the output indication signal; and electronic circuitry means interposed between said electronic comparator's sensor input and the engine's temperature indicating and sensing system, producing a momentary output indication signal from said electronic comparator when the engine's ignition switch is switched on, resulting in a momentary audio output from said audible signal transducer as a self-test, wherein said electronic circuitry means comprises a resistor-capacitor network applying a momentary ground potential at said analog to digital converter input.

4. An audible warning device for use with internal combustion engines having battery power from an ignition switch, the warning device monitoring engine oil pressure and producing an audible warning if an oil pressure loss condition develops, the improvement comprising:

an electronic representation of a predetermined reference oil pressure;

an electronic oil pressure sensing means, wherein said electronic oil pressure sensing means comprises an oil pressure switch;

an electronic comparator responsive to said oil pressure sensing means which compares a representation of the engine oil pressure, generated by said oil pressure sensing means, against said representation of a predetermined reference oil pressure, and provides an output indication signal when the engine oil pressure becomes less in magnitude than the predetermined reference oil pressure;

an audible signal transducer connected to said electronic comparator's output, which produces an audible warning signal at the presence of the output indication signal; and electronic circuitry comprising a resistor-diode network interposed between said electronic comparator's sensor input and said electronic oil pressure sensing means, producing a momentary output indication signal from said electronic comparator when engine startup occurs, prior to the buildup of oil pressure, resulting in a momentary audio output from said audible signal transducer as a self-test, wherein the internal combustion engine additionally has glow plugs and a glow plug control circuit, and wherein said electronic circuitry means additionally comprises a diode connected to the resistor-diode network and to the engine's glow plugs such that the presence of a direct current potential on the glow plugs acts to inhibit the output indication signal during glow plug operation, prior to engine starting.

5. An audible warning device for use with internal combustion engines having battery power from an ignition switch, the warning device monitoring engine oil pressure and producing an audible warning if an oil pressure loss condition develops, the improvement comprising:

an electronic representation of a predetermined reference oil pressure;

an electronic oil pressure sensing means, wherein said electronic oil pressure sensing means comprises an oil pressure switch;

an electronic comparator responsive to said oil pressure sensing means which compares a representation of the engine oil pressure, generated by said oil pressure sensing means, against said representation of a predetermined reference oil pressure, and provides an output indication signal when the engine oil pressure becomes less in magnitude than the predetermined reference oil pressure, wherein said electronic comparator comprises an analog to digital converter and a microprocessor with discrete inputs functioning as a digital comparator;

an audible signal transducer connected to said electronic comparator's output, which produces an audible warning signal at the presence of the output indication signal; and electronic circuitry means interposed between said electronic comparator's sensor input and said electronic oil pressure sensing means, producing a momentary output indication signal from said electronic comparator when engine startup occurs, prior to the buildup of oil pressure, resulting in a momentary audio output from said audible signal transducer as a self-test, wherein said electronic circuitry means comprises a connection of said oil pressure switch with a pull-up resistor to a first discrete input of the digital comparator such that when the oil pressure switch contacts are closed, a ground potential is applied to the discrete voltage input of the digital comparator producing an output indication signal, and wherein the internal combustion engine additionally has glow plugs and a glow plug control circuit, wherein said electronic circuitry means additionally comprises connection of the glow plugs to a second discrete input of the digital comparator such that the presence of a direct current potential on the glow plugs acts to inhibit the digital comparator's output indication signal during glow plug operation, prior to engine startup.

6. An audible warning device for use with internal combustion engines having battery power from an ignition switch, the warning device monitoring engine oil pressure and producing an audible warning if an oil pressure loss condition develops, the improvement comprising:

an electronic representation of a predetermined reference oil pressure, wherein said electronic representation of a predetermined reference oil pressure is a digitally-stored number in a digital comparator;

an electronic oil pressure sensing means, wherein said electronic oil pressure sensing means comprises an engine oil pressure sensor that generates an analog representation of oil pressure;

an electronic comparator responsive to said oil pressure sensing means which compares a representation of the engine oil pressure, generated by said oil pressure sensing means, against said representation of a predetermined reference oil pressure, and provides an output indication signal when the engine oil pressure becomes less in magnitude than the predetermined reference oil pressure, wherein said electronic comparator comprises an analog to digital converter and a microprocessor with discrete inputs functioning as said digital comparator;

an audible signal transducer connected to said electronic comparator's output, which produces an audible warning signal at the presence of the output indication signal; and electronic circuitry means whereby the oil pressure sensor is connected to the analog to digital converter portion of the digital comparator thus producing an output indication signal if the oil pressure's converted numerical value is less than the digitally-stored predetermined reference oil pressure and wherein a momentary output indication signal, resulting from the initial oil pressure's numerical value being less than the digitally-stored predetermined reference oil pressure prior to engine oil pressure buildup at engine startup, produces a momentary audio output from said audible signal transducer as a self-test, and wherein the internal combustion engine additionally has glow plugs and a glow plug control circuit, wherein said electronic circuitry means additionally comprises a wire connection of the glow plugs to a discrete input of the digital comparator such that the presence of a direct current potential on the glow plugs acts to inhibit the digital compartor's output indiction signal during glow plug operaton, prior to engine startup.

* * * * *